United States Patent [19]

Wührl et al.

[11] Patent Number: 4,502,042
[45] Date of Patent: Feb. 26, 1985

[54] PROXIMITY SWITCH, WHICH INDICATES THE PRESENCE OR ABSENCE OF FIELD CHANGING OBJECTS AT A DEFINED DISTANCE FROM THE PROXIMITY SWITCH BY A BINARY SIGNAL WITH THE AID OF EXCITATION AND DETECTION OF A FIELD

[75] Inventors: Arno Wührl, Mülheim; Werner Kistner, Offenbach am Main, both of Fed. Rep. of Germany

[73] Assignee: M.A.N.-Roland Druckmaschinen Aktiengesellschaft, Offenbach am. Main, Fed. Rep. of Germany

[21] Appl. No.: 359,378

[22] Filed: Mar. 18, 1982

[30] Foreign Application Priority Data

Mar. 30, 1981 [DE] Fed. Rep. of Germany ....... 3112560

[51] Int. Cl.³ .................... G08B 21/00; G08B 13/26
[52] U.S. Cl. .................... 340/568; 307/116; 340/518; 340/680
[58] Field of Search ...................... 340/518, 568, 680; 307/116

[56] References Cited

U.S. PATENT DOCUMENTS 3,514,627 5/1970 Bridgeman ...................... 340/568
3,747,085 7/1973 Bala et al. ...................... 340/680
4,121,204 10/1978 Welch et al. ...................... 307/116

OTHER PUBLICATIONS

"Proximity Control Brochure, PR151 Series Control," EDR Electronics (2285 Mt. Prospect Road, Des Plaines, IL 60018).

Primary Examiner—Glen R. Swann, III
Attorney, Agent, or Firm—Leydig, Voit, Osann, Mayer & Holt, Ltd.

[57] ABSTRACT

A multi-position proximity switch having a plurality of binary outputs, each output indicating whether the distance between an object and a field transducer exceeds a corresponding one of a plurality of predefined distances. The sensitivity of a proximity detector having a single binary output is stepped through a plurality of adjustable levels by a digital counter having decoded outputs and the binary output of the proximity switch is sampled after the decoded counter outputs change state so that a plurality of binary outputs, each associated with a detector sensitivity level and a corresponding distance, are provided. The failure of the greatest distance to be detected or the detection of the smallest distance activates an alarm indicating that the object is outside a permissible range of distances.

4 Claims, 4 Drawing Figures

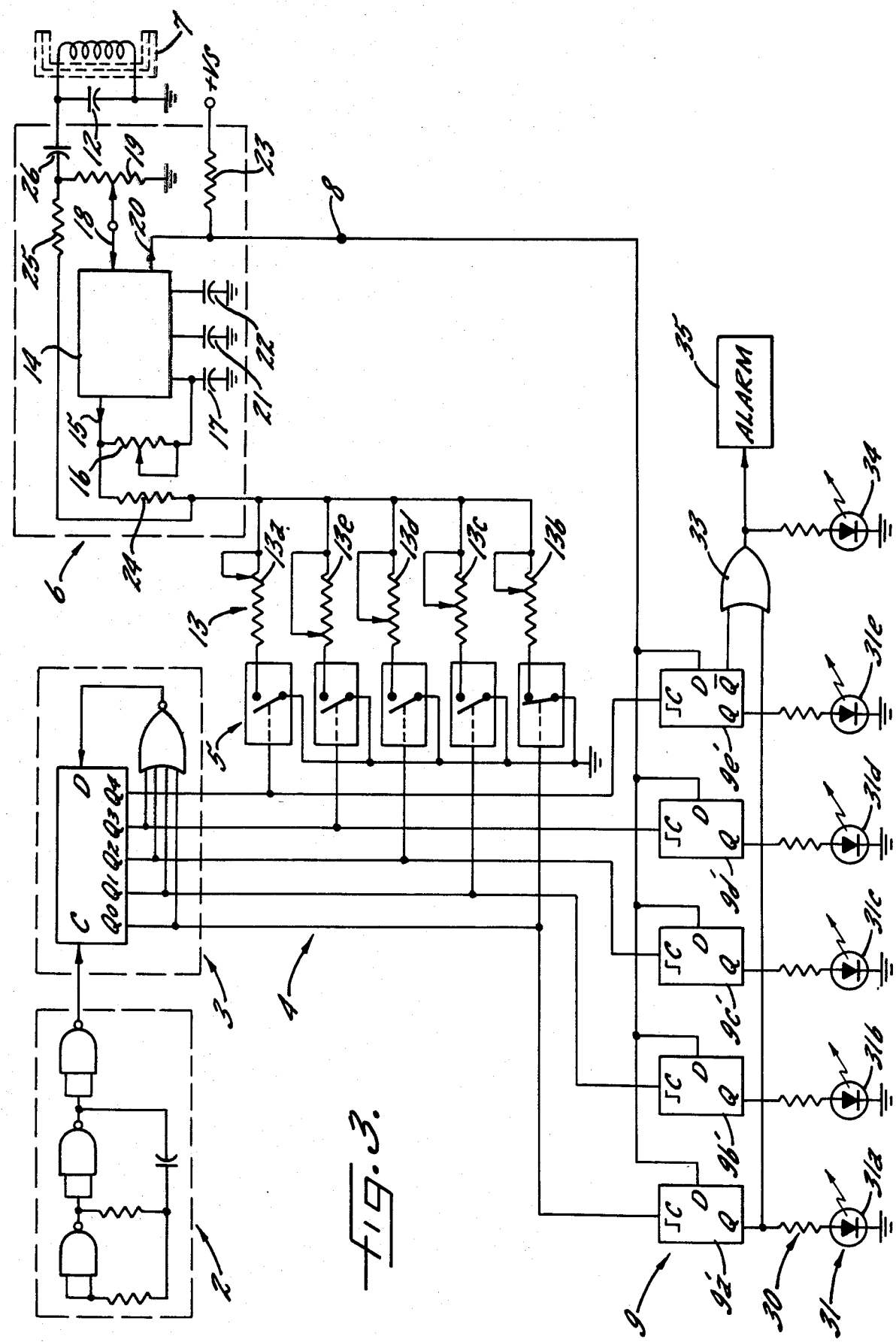

PROXIMITY SWITCH, WHICH INDICATES THE PRESENCE OR ABSENCE OF FIELD CHANGING OBJECTS AT A DEFINED DISTANCE FROM THE PROXIMITY SWITCH BY A BINARY SIGNAL WITH THE AID OF EXCITATION AND DETECTION OF A FIELD

BACKGROUND OF THE INVENTION

1. Field of the Invention

This invention relates to the field of machine control.

2. Description of Related Art

Proximity switches are well known devices used widely in machine control. The simplest proximity switch is a mechanical micro-switch which has a binary output. The switch is closed when a physical object mechanically moves the microswitch level. Today there are a number of sophisticated proximity detecting devices which may detect the presence or absence of an object without physical contact. In these devices, a field is emitted by a transducer and perturbations in the field caused by the presence of the object are sensed to determine the presence or absence of the object. A variety of fields may be used, including acoustic fields and a wide range of electromagnetic fields such as light, infrared, microwave, and electrostatic or magnetic fields. The field sensing proximity switches may be distinguished from the simple mechanical microswitch in that perturbations of the field are measured in terms of an analog electrical signal. This analog electrical signal may be displayed in analog form, but it is typically compared to a user-adjustable threshold to give a binary signal indicative of whether the object is within a predetermined distance from the field transducer.

The shortcoming of relatively simple and inexpensive field sensing proximity switches is that they typically have a single threshold. An integrated circuit called a tone decoder, type 567 such as National Semiconductor part no. LM567, for example, has a field generating oscillator and a synchronous detector all on the same chip. But the threshold detector has a fixed threshold generating a single binary output. Although the threshold level may be effectively varied by an input attentuator, such as is commonly used, there is still only a single binary output available. Thus it is desirable to have a plurality of binary outputs, each output associated with a different threshold.

Another problem associated with this simple type of threshold detector is that the threshold is set internally to the integrated circuit and may drift slightly over time. Since only a single binary output is available, it is difficult to tell from this binary output whether the threshold has changed or is set to its optimum position during the use of the proximity detector in an operating machine.

SUMMARY OF THE INVENTION

Accordingly, the general aim of the present invention is to monitor the presence or absence of an object in a plurality or pre-defined areas. Typically, a proximity switch is desired that will resolve the distance of an object to a field transducer to within a plurality of distance increments, in addition to detecting the mere presence or absence of the object.

Another object is to provide a plurality of binary logic outputs so that the threshold used in determining the presence or absence of an object at a particular location may be determined during use of the proximity detector by observing the logic states of the logic outputs. A related objective is to detect the failure of the proximity switch or the failure of a machine having the object under control by observing whether the positions detected by the proximity switch are within a normal or acceptable range of positions.

Moreover, another object of the invention is to provide a plurality of binary logic outputs in which only a few of the possible binary combinations represent outputs generated by a properly functioning proximity detector so that malfunctions may be detected. A related object is to provide a proximity switch with a plurality of binary logic outputs in which the typical order or sequence of changes in the binary outputs can be monitored with an atypical order sequence indicating circuit malfunction or malfunction of a mechanical device monitored by the proximity detector.

Another object of the invention is to provide an electrical circuit which is simple, inexpensive, and reliable, and which may be added to existing proximity switches as used on machines to convert these existing proximity switches to multi-position proximity switches according to the invention.

BRIEF DESCRIPTION OF THE DRAWING

Other objects and advantages of the invention will become apparent upon reading the following detailed description and upon reference to the drawings in which:

FIG. 3 is a detailed circuit schematic of a preferred embodiment of the invention using CMOS logic components and a type 567 tone decoder integrated circuit.

Figure 1:
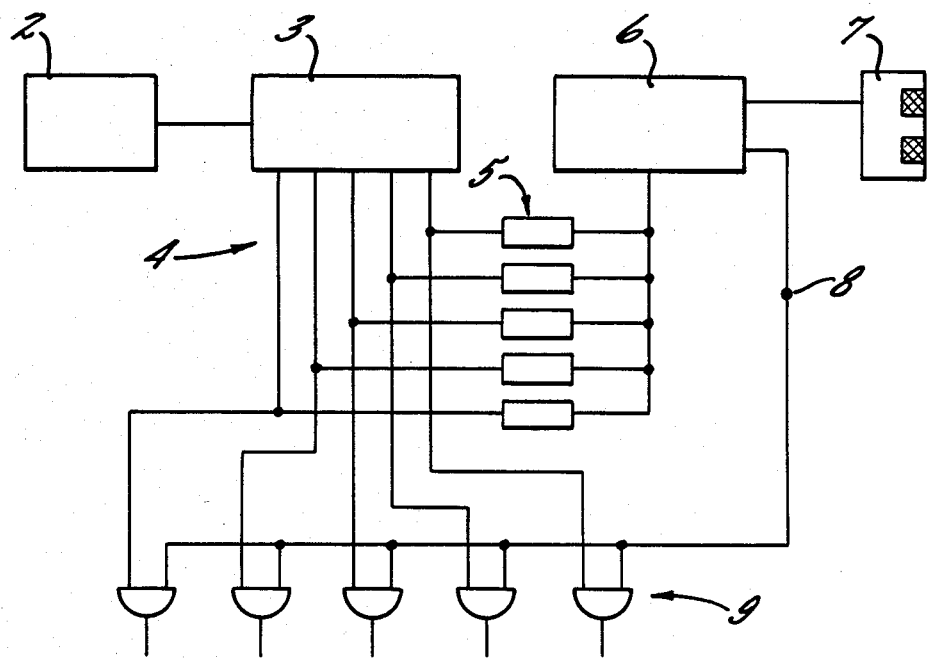
FIG. 1 is a block diagram of a multi-position proximity switch according to the invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contary, the intention is to cover all modifications, equivalents, and alternatives falling within the spirit and scope of the invention as defined by the appended claims.

DESCRIPTION OF THE PREFERRED EMBODIMENT

Turning now to the drawings, in FIG. 1 there is shown a block diagram of a multi-position proximity switch according to the invention. The proximity switch has a pulse generator 2 driving a binary counter 3 with decoded binary outputs 4 which are repetitively and sequentially scanned. This scanning is a property of all counters having decoded outputs, and merely means that only one of the outputs are logically high at any given time and the high output appears sequentially on different ones of the outputs 4. The outputs 4 are used to activate electronic switches 5 which control the sensitivity of a proximity switch 6 having a field transducer 7. The proximity switch 6 and field transducer 7 are common items widely used in machine control. A feature of the present invention is that it may be used with practically any type of proximity switch detecting the presence of an object using a field transducer. The field transducer is typically an electromagnetic or optical transducer. The proximity switch 6 generates a binary signal indicating the presence of absence of a field changing object 11, shown in FIG. 2A, within a predefined distance from the transducer 7 depending on the gain of the proximity switch as selected by the electronic switches 5. The single binary output 8 is multiplexed to a plurality of binary outputs by detecting the coincidence of the single binary output 8 with the decoded outputs 4 of the binary counter 3. Generally the coincidence detecting function is logically represented as AND gates generally designated 9. The output of each individual gate will correspond to a particular gain setting selected by an associated electronic switch 5, the associated switch and the respective logic gates being enabled in response to the same state of the binary counter 3.

In general, the pulse generator 2 and binary counter 3 comprise a digital scanning means for generating a scanning signal that activates the electronic switches 5 which in turn provide a digitally controlled gain adjusting means for controlling the gain of the proximity switch 6 having the single binary output 8. Binary output 8 then is converted to a plurality of binary outputs by the AND gates 9 which are coincidence detecting means for detecting coincidence between the digital scanning signal on the binary counter 3 outputs 4 and the output 8 of the proximity detecting switch 6.

Figure 2A:
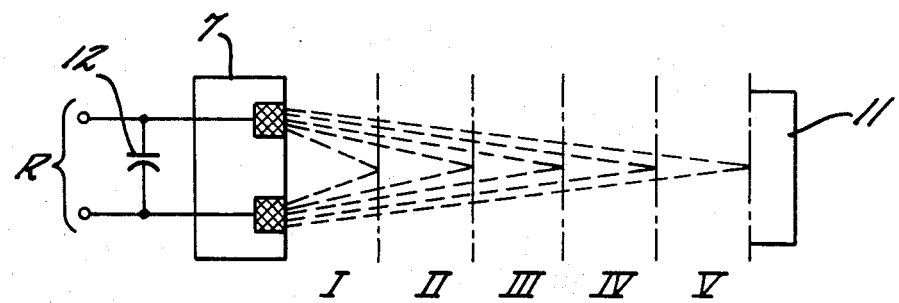
FIG. 2A is a pictoral diagram of the sensing field generated by an electromagnet coil transducer.
Figure 2B:
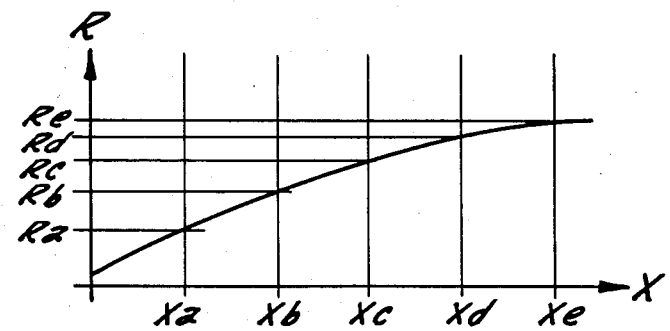
FIG. 2B is a corresponding graph of the resistance of the coil at its resonate frequency as a function of distance of an object from the sensing coil.

The operation of the proximity switch according to the invention is pictorially illustrated in FIG. 2A and FIG. 2B. The distance between the field transducer coil 7 and an object be detected 11 may be considered to be divided into a plurality of regions I,II,III,IV,V. The coil 7 is excited by an alternating current with the frequency selected as the resonant frequency of the inductance of the coil 7 and the capacitance across the coil represented by a capacitor 12. Capacitor 12 is in practice the sum of the parasitic capacitance of the coil and a capacitor wired in parallel with the coil to adjust the resonant frequency. The coil 7 emits a time-varying electromagnetic field which permeates regions I-V. The object 11 such as a conductive metal plate loads down the coil 7 by absorbing electromagnetic energy. The load on the coil 7 is observed on the terminals of the coil as a decrease in the resistance R at the resonant frequency. As show in FIG. 2B, the resistance R decreases as a function of the distance X of separation between the transducer coil 7 and the object 11. The distances of the interfaces between the regions I-V are denoted Xa, Xb, Xc, Xd, and Xe in FIG. 2B. For each of these threshold distances there is a corresponding threshold resistance Ra through Re, respectively. Thus the presence or absence of the object 11 in the various regions may be determined by measuring the resistance R at the terminals of the coil 7 and comparing that resistance to the threshold resistance Ra-Re.

As shown in FIG. 3, a particular embodiment of the invention corresponding to the block diagram of FIG. 1 uses a conventional proximity switch 6 to sense the resistance R of the coil 7. The proximity switch is built around a type 567 tone decoder 14 (such as National Semiconductor part No. LM567) which generates an oscillating signal on the output 15 set by the RC product of a variable resistor 16 and a capacitor 17. The tone decoder 14 compares this frequency of oscillation to the input signal on input 18 having an amplitude adjusted by the variable resistor 19. If a substantial signal on the input 18 having the same frequency as the output on line 15 is detected, then the integrated circuit 14 shunts the open collector output 20 to ground. The detection operation of the tone decoder 14 has a time constant set by capacitors 21 and 22. This time constant is typically selected on the order of at least 10 to 100 times the period of the oscillation by varying the values of the capacitors 21, 22 for a detection time versus signal-to-noise tradeoff. The pull-up resistor 23 to positive supply +Vs insures that there is a binary logic signal on the output line 8.

Thus, the tone decoder 14 detects whether the output signal 15 becomes transferred to the input 18. For the purposes measuring the resistance R, the electromagnet coil 7 is part of a voltage divider also comprising series resistors 24 and 25 and capacitor 26 coupling the series resistors to the resistance of the coil 7. This voltage divider generates a reduced amplitude signal proportional to the coil resistance that is variably attenuated by resistor 19 and fed to the input 18. Thus the output 20 of the tone decoder has a logic state responsive to the resistance of the coil 7 with the sensitivity, or threshold resistance, adjusted by the variable resistor 19. As described, the combination of the tone decoder 6 and the field coil 7 constitutes one embodiment of a conventional type proximity detector wherein the binary output 8 indicates the presence or absence of an object 11 at a predetermined distance from the coil 7, the predetermined distance being set by the adjustment of variable resistor 19. If the object is closer to the coil 7 than the predetermined distance, then the signal transmission from the output 15 to the input 18 is blocked thereby causing the logic state of the output line 18 to go low. If the object 11 is further from the coil 7 than the predetermined distance, then the logic state on the output line 8 is forced high.

According to the present invention, the sensitivity or threshold of the proximity detector 6 may be automatically set to any one of a plurality of levels, preset by the adjustment of variable resistors generally designated 13 as selected by the electronic switches generally designated 5. The electronic switches 5 are switched repetitively in a periodic sequence by the binary counter 3 implemented as a shift register counter and clocked by the pulse generator 2. The shift register configuration for the binary counter 3 is the simplest implementation which individual logic gates but it is equivalent to more complex binary counters with decoded outputs such as CMOS part no. 4017 (decade counter/divider with decoded outputs) or 4022 (divide-by-eight counter/divider with eight decoded outputs). The transmission gates 5 are nominally CMOS part no. 4016. It should be noted that the binary counter 3 activates only one of the switches 5 at any given time. Switches 5 are in series with the variable resistors 13 which are in turn connected in parallel so that at any given time only one of the variable resistors 13 is switched to ground. Resistors 13 are connected to the common node between resistors 24 and 25 so that they attenuate the signal generated by the tone decoder 14 on the output 15 and received on the input 18. Thus the sensitivity of the proximity switch 6 at any given time is controlled by one of the variable resistors 13.

As shown in FIG. 3, the coincidence detecting means is implemented by type D-type flip-flops 9'a-9'e. The Q outputs of the flip-flops (CMOS part no. 4013) have logic states determined by the logic states on the D inputs coincident with the rising edge of the C inputs. Thus the flip-flops 9 are equivalent to logical AND gates for the purpose of the invention, but the coincidence detecting function is performed only for a very narrow period of time and the result of the coincidence detection is sampled or held on the Q outputs. The logic state of the Q outputs are fed through current limiting resistors 30 to light emitting diodes 31 so that the light emitting diodes 31 may indicate the logic states of the flip-flops.

In typical operation, the coil 7 is excited at a relatively high frequency on the order of ten kilohertz as set by the inductance of the coil 7, and the values of capacitor 12, capacitor 17 and resistor 16. Resistor 16 is variable so that the oscillator frequency may be tuned for a maximum voltage response across the coil 7. With the object 11 removed from the presence of the coil 7 and with the resistors 13 being set to their maximum resistance values, the variable resistor 19 is adjusted to the point at which the output on line 8 just goes low. This is a full scale sensitivity adjustment for the proximity detector 6.

The detection time for the detector 6 is the time delay required for the proximity switch 6 to respond to the presence or absence of an object after the gain of the detector has been changed by a change in the digital scanning signal on the counter outputs 4. The detection time should be set on the order of 1 to 10 milliseconds by selection of the values of capacitors 21 and 22. This means that the outputs on line 4 should change at a slower rate, or on the order of 5 to 50 milliseconds. In other words, the resistor and capacitor values for the pulse generator 2 have a time constant on the order of 5 to 50 milliseconds for a pulse repetition rate on the order of 20 to 200 hertz. Consequently, the rate at which electronic switches 5 are scanned is 5 times less, or about four to forty times a second.

D flip-flops are used instead of AND gates to perform the coincident detecting function so that continuous outputs may be obtained on the LED's 31 despite the previously mentioned time delays. 10 milliseconds after resistor 13a is selected, for example, the integrated circuit 14 will respond to the change and after approximately 40 more milliseconds, a stable output will be obtained on line 8 which is sampled at that time by flip-flop 9'a. (It should be noted that flip-flop 9'a is clocked by the rising transition of $Q_0$ which is coincident with the falling transition of $Q_4$ at the end of the time interval for which resistor 13a is selected in response to $Q_4$ being a logic high.). The sample value will be held on the Q output and displayed as a steady indication on the LED 31a until the flip-flop 9'a is updated approximately 200 to 250 milliseconds later. (It should be noted, however, that these delay times are very conservative and faster sampling rates may be obtained by using smaller component values for the resistances, capacitances, and inductances in the circuit.) In a similar manner, resistor 13b sets the threshold level for the signal sampled by the flip-flop 9'b and the other variable resistors 13 set the thresholds associated with their respective flip-flops. Variable resistors 13 may be adjusted so that the presence of the object 11 is just detected at corresponding distances X by placing the object 11 at the distance X and adjusting the respective variable resistor 13 until the associated LED 31 just goes on and off. If this adjustment procedure is performed for the distances X drawn in FIG. 2b, then the LED's 31 give a bar graph indication of the position of the object 11. In other words, when object 11 is to the right of region V in FIG. 2a, then all of the LED's 31a-31e will be dark, corresponding to the binary output (00000). If the object 11 is moved into region V, then only LED 31e will light up, corresponding to the binary output (00001). When the object 11 is successively moved from region V to region 1, then LED's 31d, 31c, 31b, 31a will light up in succession, giving the visual appearance to a bar of light moving from the right to the left in FIG. 3. Thus the LED's 31a-31e indicate the position of the object 11 from the detector coil 7 within a plurality of distance increments in addition to detecting the mere presence or absence of the object 11. Moreover, in a typical machine control application the machine control threshold corresponds to the threshold for the middle LED 31c and thus the Q output of flip-flop 9'c is used as a binary machine control output. In the past there was no simple way to determine whether the threshold was set properly while the machine was operating. But with the circuit shown in FIG. 3, proper adjustment of the machine control threshold is indicated by the fact that LED's 31d and 31e should normally remain lit while LED's 31a and 31b should normally remain dark as the object oscillates between regions III and IV during normal operation of the machine. Moreover, the thresholds for LED's 31a and 31e may be adjusted to indicate whether the position of the object 11 exceeded maximum permissible limits of machine operation. For this purpose, OR gate 33 activates an alarm 35 if the object is closer to the coil 7 than the minimum distance indicated when LED 31a is lit or is further from the coil than the maximum distance indicated when LED 31e is dark. The logic state of the OR gate 33 is conveniently indicated by LED 34.

It should also be noted that the operator may determine whether the circuit itself is properly functioning by observation of the logic states of the LED's 31 and the sequence in which the LED's 31 change. The LED's should always have the appearance of a bar graph which logically means that the binary output must be equal to one of the six permissible binary states, (00000), (00001), (00011), (00111), (01111), (11111). Also, with the scanning rate set faster than the rate at which the object 11 can travel through the regions I–V, then only one of the LED's 31a-31c may change its indication for a scan period. In other words, the machine operator should always see the bar graph pattern move uniformly to the right or to the left, without moving irratically or skipping LED's.

What is claimed is:
1. A multi-position proximity switch comprising, in combination:
   proximity detecting switch means having a field exciting transducer and a binary output for indicating the presence or absence of a field perturbing object at a preselected distance from the field transducer and an electronic gain control input for adjusting said preselected distance,
   digital-controlled gain adjusting means having a digital input and an electronic output for generating an electronic gain control signal in response to the digital input, the electronic output being connected to the gain control input of the proximity detecting switch,
   digital scanning means for generating a digital time-varying scanning signal, the digital signal being applied to the digital-controlled gain adjusting means, thereby adjusting the proximity detecting switch to detect the presence or absence of a field perturbing object at a plurality of difference preselected distances from the field transducer, and coincidence detecting means for detecting the coincidence between the digital scanning signal and the binary output of the proximity detecting switch, so that the presence or absence of a field perturbing object at each preselected distance from the field transducer is detected.

2. The combination as claimed in claim 1 further comprising out-of-range sensing and indicating means active upon the failure of the coincidence detecting means corresponding to the largest distance to be active, and also active when the coincidence detecting means corresponding to the smallest distance is active, so that failure of the proximity switch and out-of-range positions are sensed.

3. The combination as claimed in claim 1 or claim 2 wherein:

(a) the digital scanning means comprises a binary counter having decoded outputs and a periodic pulse generator feeding the clock input of the binary counter, so that the decoded outputs are repetitively and successively activated, (b) the digital controlled gain adjusting means comprises a plurality of electronic switches activated by the decoded outputs, at least one electronic switch being provided for each decoded output, and having a resistor of different resistance value in series with the switch, the combination of switches and resistors being connected in parallel defining two common nodes, the common nodes being connected to the gain control input of the proximity detecting switch means and providing an electronic gain control signal, so that the impedance between the common nodes is modulated in response activation of the decoded outputs of the counter, and (c) the coincidence detecting means comprises a plurality of coincidence logic gates, at least one gate being provided for each decoder counter output and receiving its associated decoded counter output and the binary output of the proximity detecting switch means as inputs, so that the output of each coincidence logic gate indicates whether the object is within a predetermined distance of the field transducer as predetermined by the value of the corresponding resistor.

4. The combination as claimed in claim 1 or claim 2 wherein the proximity detecting switch means has a field transducer including an electromagnet coil, and further comprises an oscillator generating an alternating current exciting the coil and a detector for comparing the response of the coil to a threshold.

* * * * *